Sept. 26, 1961 P. J. HILL 3,001,605
DEHYDRATING APPARATUS
Filed Feb. 12, 1958

INVENTOR.
Philip J. Hill
BY
ATTORNEY

3,001,605
DEHYDRATING APPARATUS
Philip J. Hill, 7340 E. King St., Tulsa, Okla.
Filed Feb. 12, 1958, Ser. No. 714,799
1 Claim. (Cl. 183—4.3)

This invention relates to an improved means for dehydrating a flow stream and more particularly, but not by way of limitation, to a combined filter and dehydration cartridge unit for removing water from a natural gas stream, or the like.

A natural gas stream or other fluid flowing from a producing oil or gas well normally comprises a mixture of hydrocarbons and water. The sub-surface temperatures and pressures in a well bore are sufficient to prevent condensation of the water and hydrates present in the gas stream. However, a pressure and temperature drop occurs as the stream flows upwardly toward the surface, and thus condensation of the water and hydrates takes place. Furthermore, the water and hydrates tend to condense in the flow line and form frozen particles which may accumulate within the line and ultimately completely preclude the flow of fluid therethrough. It is, therefore, desirable to remove the water and hydrates from the flow stream upon discharge thereof from the well to enhance the flow thereof through the pipe line for storage or distribution.

The present invention contemplates a novel filter cartridge which simultaneously filters the hydrates from the hydrocarbon emulsion and separates the water from the flow stream. The influent is directed through the filter walls of the cartridge unit and into contact with a suitable dehydrating chemical. The hydrates and other undesirable particles are filtered from the influent as the flow stream passes through the filter walls, and substantially all the water present in the flow stream is absorbed by the chemical. The wetted portions of the chemical readily go into solution with the water and precipitate downwardly therewith toward the bottom of the filter vessel. The flow stream which is discharged from the vessel is a filtered and dehydrated emulsion substantially free of the hydrates and water components thereof.

It is an important object of this invention to provide a filter cartridge unit for efficiently dehydrating a flow stream passing therethrough.

It is another object of this invention to provide a filter cartridge unit for simultaneously filtering and dehydrating a flow stream passing therethrough.

It is still another object of this invention to provide a combined filter and dehydration cartridge which automatically maintains the dehydrating chemical in a compressed condition for assuring an efficient chemical reaction thereof to efficiently remove substantially all the water present in the flow stream.

It is a further object of this invention to provide a novel filter and dehydration cartridge unit which is simple and efficient in operation and economical and durable in construction.

Other objects and advantages of the invention will be evident from the following detailed description, read in conjunction with the accompanying drawings, which illustrate my invention.

Figure 1:
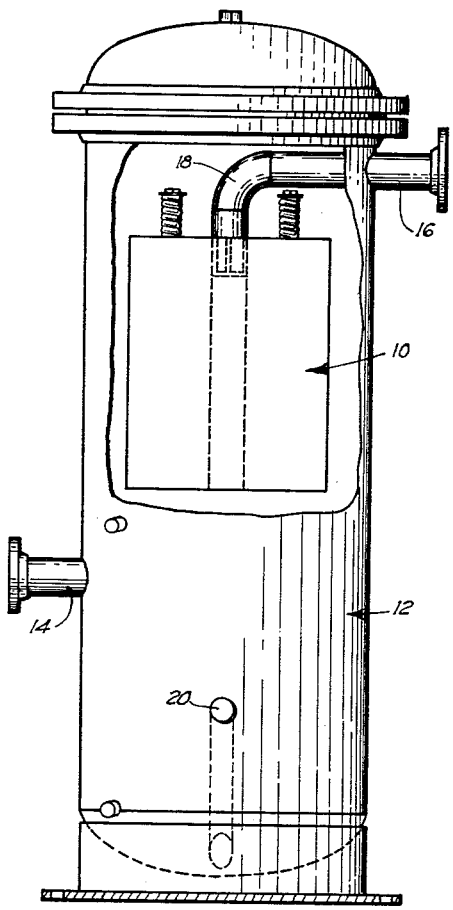
FIGURE 1 is a side elevational view of a vessel having a portion thereof cut away to depict a filter cartridge embodying the invention disposed therein.

Referring to the drawings in detail, reference character 10 refers in general to a filter and dehydrating cartridge adapted to be disposed within a suitable vessel 12. The vessel 12 is provided with a suitable inlet pipe member 14, preferably disposed in the lower portion of the vessel 12 for directing the influent into the interior thereof. An outlet or discharge pipe 16 is provided in the upper portion of the vessel 12, and is suitably connected to the cartridge unit 10 by a conduit 18 for discharging the filtered and dehydrated influent therefrom to a pipe line gathering system, or the like (not shown). A suitable sump 20 is provided in the lower portion of the vessel 12 for discharging the precipitates or residue (not shown) therefrom.

The cartridge unit 10 comprises an outer cylindrical housing 22 having an inner tubular member 24 concentrically disposed therein. The housing 22 and tubular member 24 are made of any suitable filter material, such as fiber glass, or the like, in order to permit fluid to pass therethrough in a manner as will be hereinafter set forth. The housing 22 is slightly longer than the central tube 24 and is closed at its lower end by a disc member or screen 23 which permits fluid to flow freely therethrough. The upper end of the tube 24 is open at 25, and the lower end thereof is closed by a solid disc 26 made of metal, or any suitable impervious material in order to preclude fluid entering the tube 24 therethrough.

A screen member 28 is slidably disposed around the tube 24 in the annular space 30 between the inner tube 24 and the outer housing 22. An apertured cover member 32 is provided for the housing 22, and is preferably made of metal to provide rigidity at the top thereof. A plurality of spaced stud members 34, preferably four, but not limited thereto, are longitudinally disposed through the annular space 30 and extend upwardly through the cover member 32 and downwardly slightly below the screen member 28. The lower end of each of the studs 34 is threaded to receive a nut 35 for securing the stud 34 to the screen 28 for a purpose as will be hereinafter set forth. An outwardly extending circumferential flange 36 is provided on the upper end of each rod 34 and is maintained thereon by a suitable nut 38. A helical spring 40 is disposed around each of the stud members 34 between the flange 36 and the cover member 32 and constantly urges the flange member 36 in an upward direction away from the cover member 32. A suitable dehydrating chemical 42, such as calcium chloride, is compressed within the annular space 30 and is interposed between the upper screen member 28 and the cover member 32. It will be understood that any chemical which is soluble in water and non-soluble in hydrocarbons could be utilized.

Operation

Figure 2:
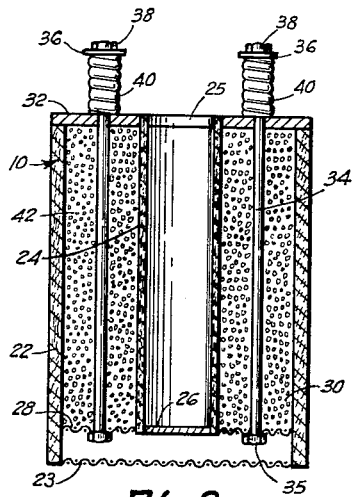
FIGURE 2 is a sectional elevational view of a filter and dehydration unit embodying the invention.

The filter and dehydrating cartridge 10 is preferably installed in any suitable manner (not shown) within the upper portion of the vessel 12. The central opening 25 of the tubular member 24 is in communication with the conduit 18 as clearly shown in FIG. 1. The cartridge unit 10 is fully charged with the dehydrating chemical 42 so that the screen member 28 is disposed adjacent the lower end of the tube 24 as shown in FIG. 2. In this position, the spring members 40 are compressed between the flange members 36 and the cover member 32.

The influent, comprising a mixture of hydrocarbons and water, enters the vessel 12 through the inlet conduit 14. The influent passes radially through the walls of the outer housing 22 whereby hydrates and foreign particles are filtered from the mixture. The fluid then travels through the dehydrating chemical 42 wherein substantially all the water components present in the mixture react therewith to form an aqueous solution. This solution falls downwardly from the filter unit 10 and passes through the screens 28 and 23 to accumulate in the lower portion of the vessel 12, and may be discharged therefrom by means of the sump 20 in any well known manner.

The remaining constituents of the influent passing through the filter cartridge 10 travel radially through the walls of the tube 24 whereby the mixture is filtered once again to assure an efficient filtration thereof. The resultant fluid is substantially free of water and foreign debris, and is discharged from the tube 24 through the opening 25 into the conduit 18 and through the outlet pipe 16 for delivery to storage, or the like.

Figure 3:
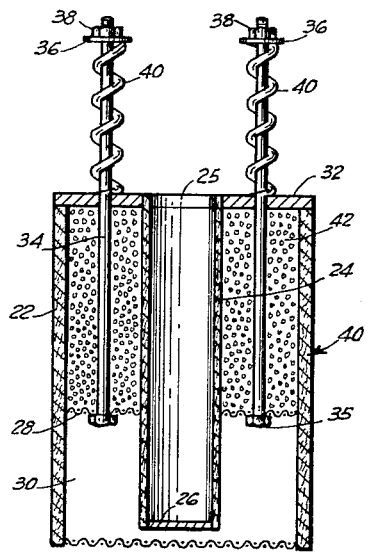
FIGURE 3 is a view similar to FIG. 2 showing the novel dehydration cartridge in a partially full condition.

The dehydrating chemical 42 readily reacts chemically with the water to adsorb the water and form an aqueous solution, and is lost from the cartridge 10 as the solution precipitates downwardly into the vessel 12. As the quantity of the chemical 42 decreases in the cartridge 10, the pressure action downwardly on the slidable screen 28 is reduced. Thus, the action of the springs 40 against the flanges 36 urge the flanges upwardly. The nut members 38 preclude an upward movement of the flanges 36 with respect to the rod members 34, and therefore the rods 34 are moved upwardly by the flanges 36. The rods 34 are secured to the screen 28 by the nuts 38, and thus the screen 28 moved upwardly with the rods 34 until the chemical 42 remaining in the cartridge 10 is sufficiently compressed to overcome the action of the springs 40, as shown in FIG. 3. In this manner, the dehydrating chemicals are automatically maintained sufficiently compressed to efficiently dehydrate the fluid passing therethrough.

It will be apparent that FIG. 3 depicts an exaggeration of the amount of contraction of the dehydrating chemical. In actual practice, the chemical will be very slowly reduced in quantity, and the cartridge unit may be utilized for a considerable length of time before any appreciable reduction of the chemical occurs. Thus, the necessity of replacing or recharging the cartridge to maintain an efficient operation thereof is reduced to a minimum.

From the foregoing, it will be apparent that the present invention provides a novel cartridge unit wherein an influent may be filtered and dehydrated in a one stage operation. Furthermore, the dehydrating chemicals disposed within the cartridge unit are constantly maintained under sufficient compression pressure to assure an efficient dehydrating action thereof for removing the water components from the influent. The novel cartridge unit is of an economical and durable construction and may be readily installed within a vessel for filtering and dehydrating an influent passing therethrough. The simplicity of operation of the novel device reduces maintenance thereof to a minimum, and thus provides a simple and economical means of dehydrating and filtering a fluid mixture.

Changes may be made in the combination and arrangement of parts as heretofore set forth in the specification and shown in the drawings, it being understood that any modification in the precise embodiment of the invention may be made within the scope of the following claim, without departing from the spirit of the invention.

I claim:

An apparatus for removing from fluid flowing from a well bore hydrates and water suspended therein, comprising a cylindrical vessel having closed ends, the vessel provided with an inlet pipe in the lower portion thereof for directing fluid into the interior thereof, said vessel provided with an outlet pipe in the upper portion thereof, the vessel further provided with a filter and dehydrating cartridge comprising an outer cylindrical fiberglass housing having one end thereof closed by a screen member and the opposite end thereof closed by an apertured cover member, an inner fiberglass tube member concentrically disposed within the outer housing and having one end thereof closed and the opposite end thereof open, a second screen member slidably disposed around the inner tube in the annular space between the inner tube and the outer housing, a plurality of spaced stud members secured to the second screen member and extending through the cover member, a circumferential flange member rigidly secured to the outer end of each stud member, a helical spring member disposed between the flange and the cover member, a dehydrating chemical disposed above the second screen member in the annular space between the inner tube and the outer housing, said spring constantly urging the flange member in a direction away from the cover member to urge the slidable screen member into contact with the chemical thereabove for maintaining the compression of the chemical constant for efficient dehydration of the fluid, said apparatus adapted to direct the flow of the well fluid radially inward through the outer filter housing for removing hydrates therefrom, to further direct the well fluid through the dehydrating chemical contained in said annular space for removing the water suspended therein, and then to direct the well fluid through the inner tube for a further cleansing therefrom of hydrates, and a conduit connected from the interior of the cartridge to the outlet pipe for discharging from the vessel the filtered and dehydrated well fluid.

References Cited in the file of this patent

UNITED STATES PATENTS

| | | |
|---|---|---|
| 1,601,308 | Hill | Sept. 28, 1926 |
| 1,772,089 | Smith | Aug. 5, 1930 |
| 1,920,915 | Poggel | Aug. 1, 1933 |
| 2,586,670 | Lambertsen | Feb. 19, 1952 |

FOREIGN PATENTS

| | | |
|---|---|---|
| 448,961 | Great Britain | June 18, 1936 |